May 11, 1954 G. HERZOG 2,678,398
PROSPECTING
Filed March 19, 1951 8 Sheets—Sheet 1
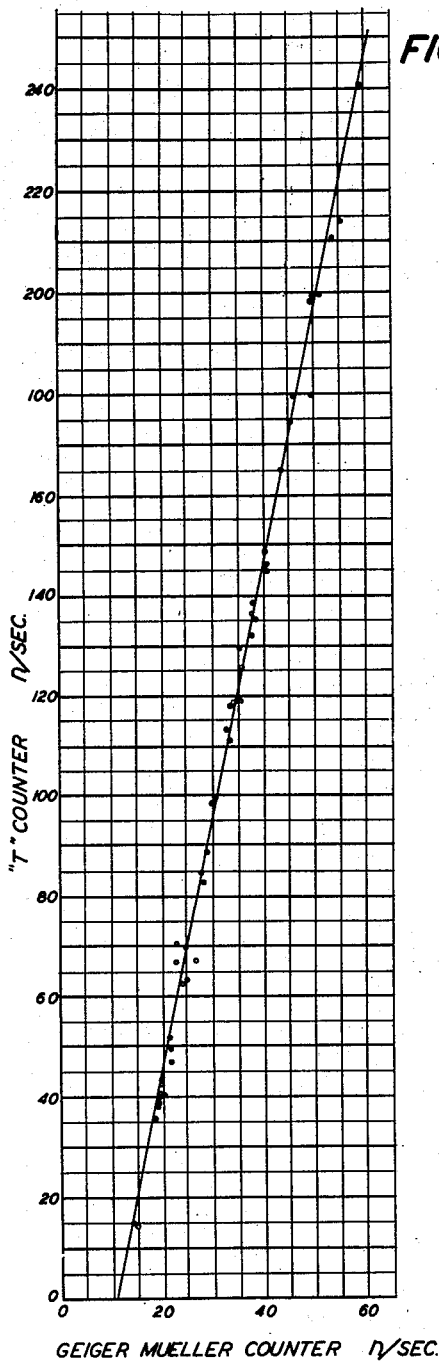
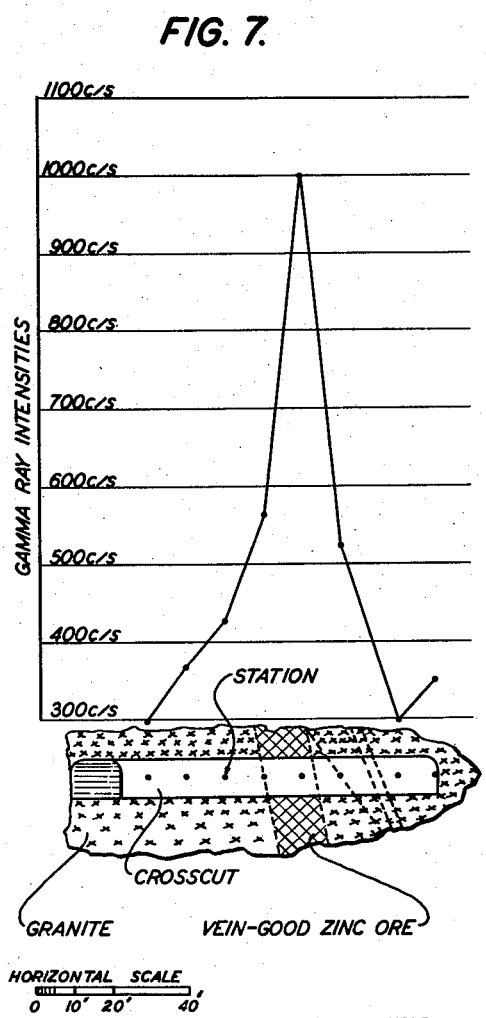
INVENTOR.
GERHARD HERZOG
BY
ATTORNEY May 11, 1954 G. HERZOG 2,678,398
PROSPECTING
Filed March 19, 1951 8 Sheets-Sheet 2

INVENTOR.
GERHARD HERZOG
BY
ATTORNEY

May 11, 1954

G. HERZOG 2,678,398

PROSPECTING

Filed March 19, 1951

INVENTOR.
GERHARD HERZOG

BY

ATTORNEY

May 11, 1954  G. HERZOG  2,678,398
PROSPECTING
Filed March 19, 1951
8 Sheets-Sheet 4
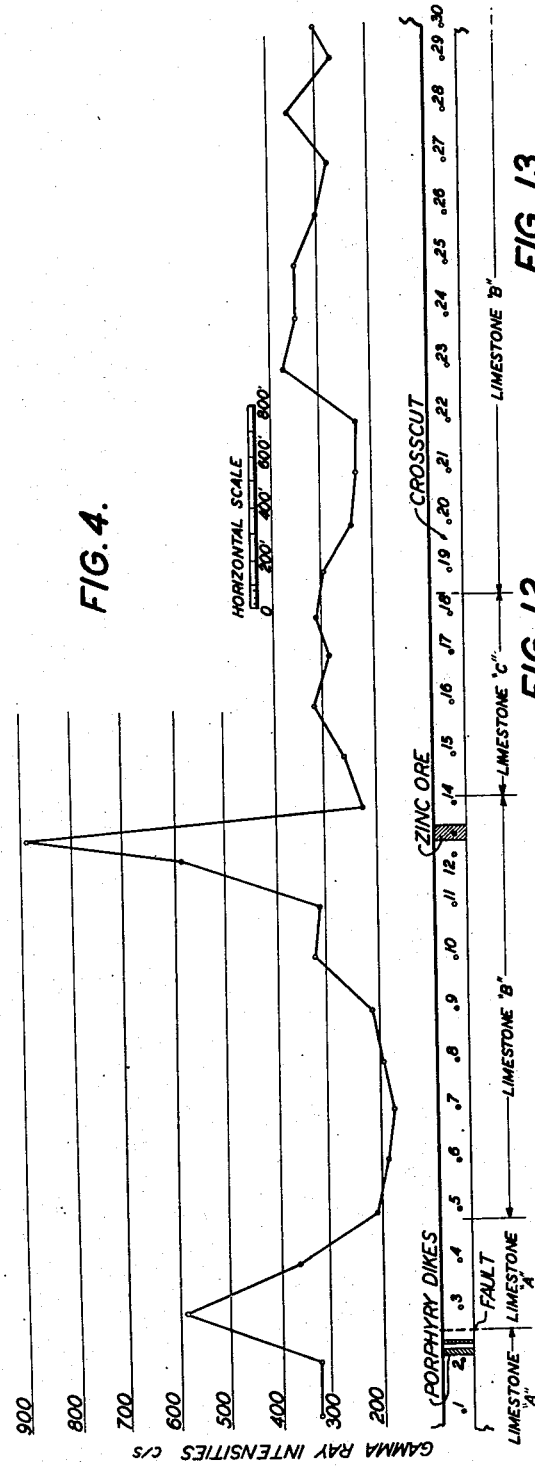
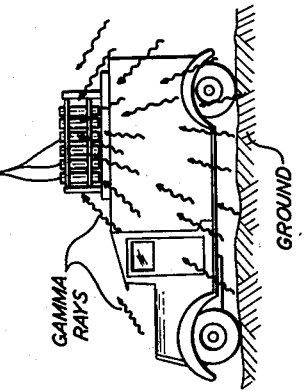
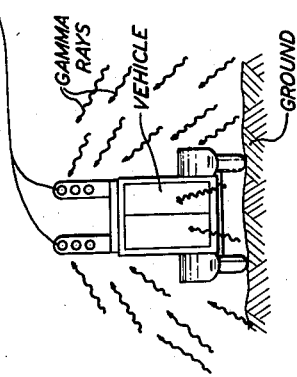
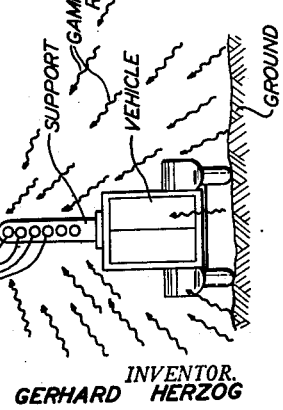
INVENTOR.
GERHARD HERZOG
BY
ATTORNEY May 11, 1954  G. HERZOG  2,678,398
PROSPECTING
Filed March 19, 1951  8 Sheets-Sheet 5
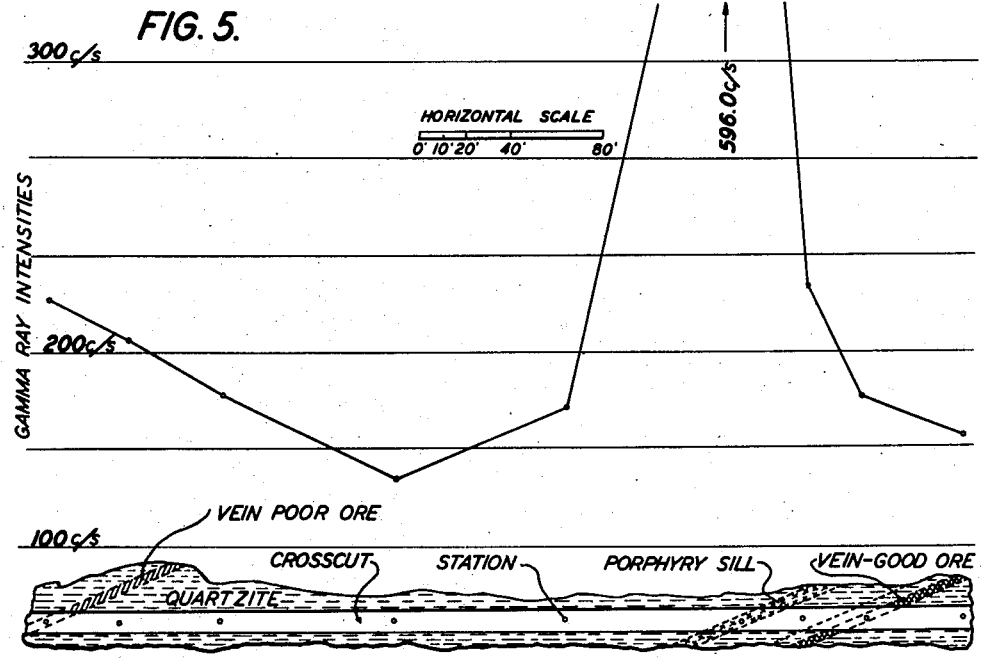
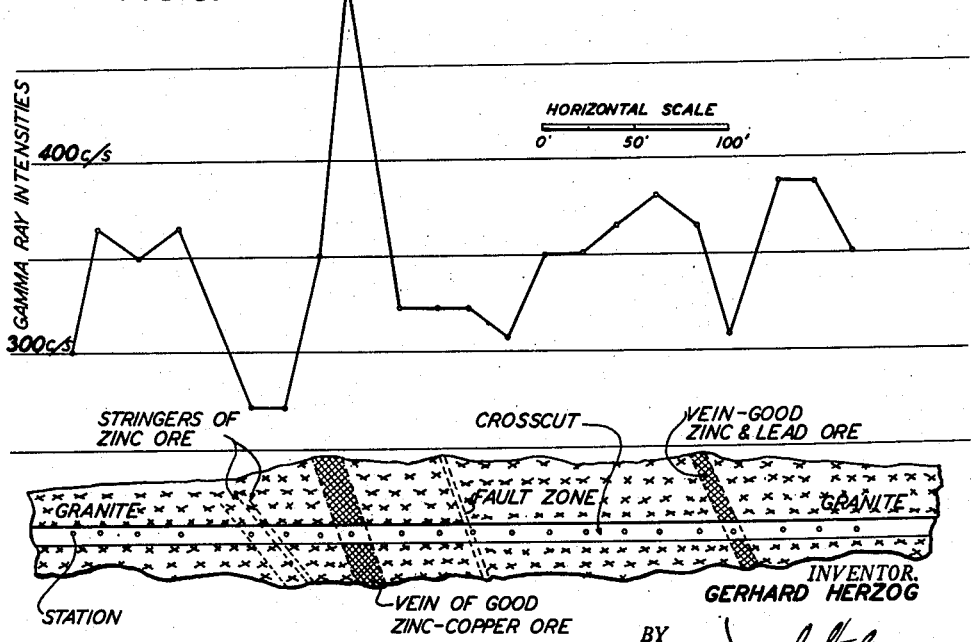
INVENTOR.
GERHARD HERZOG
BY
ATTORNEY

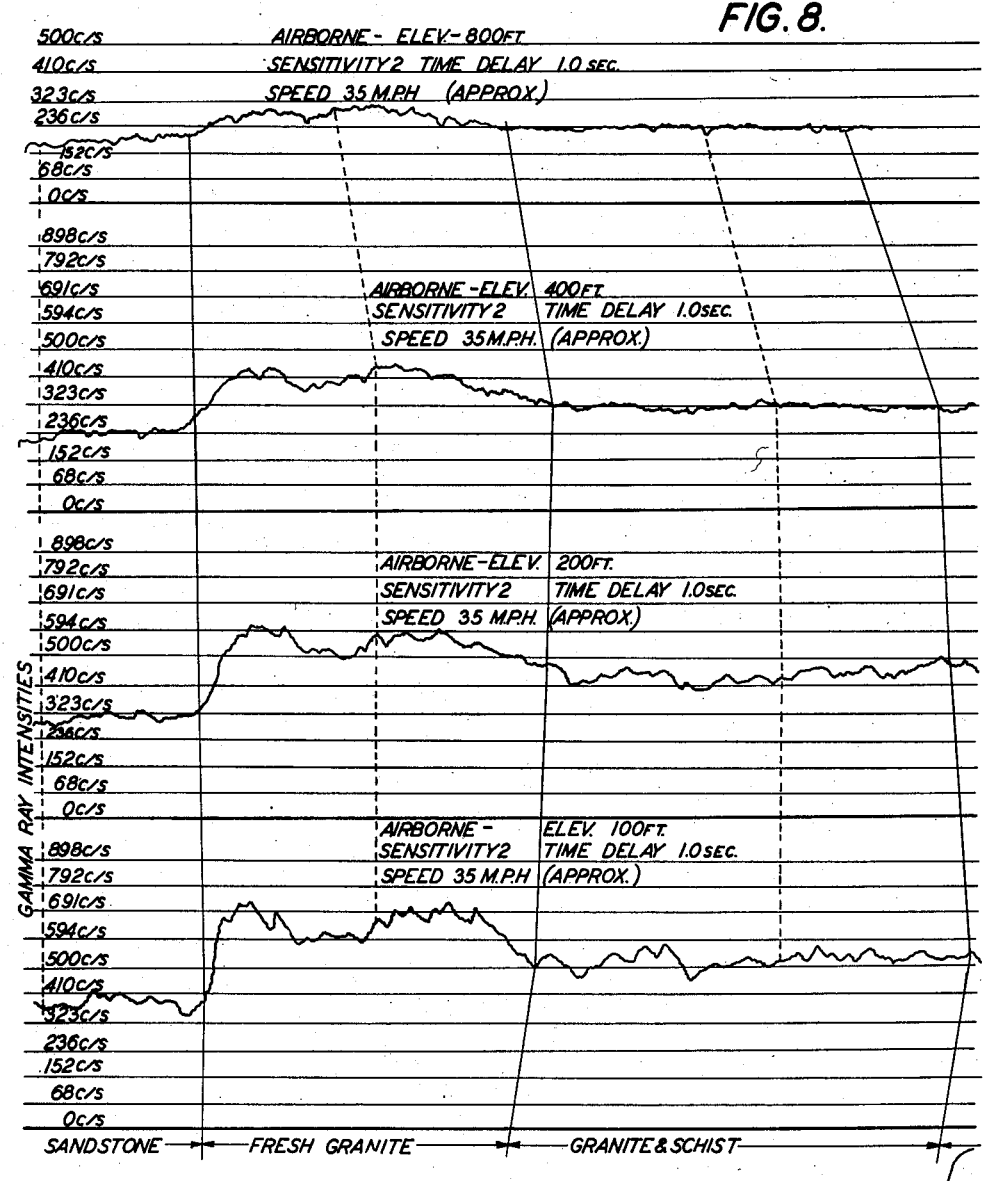

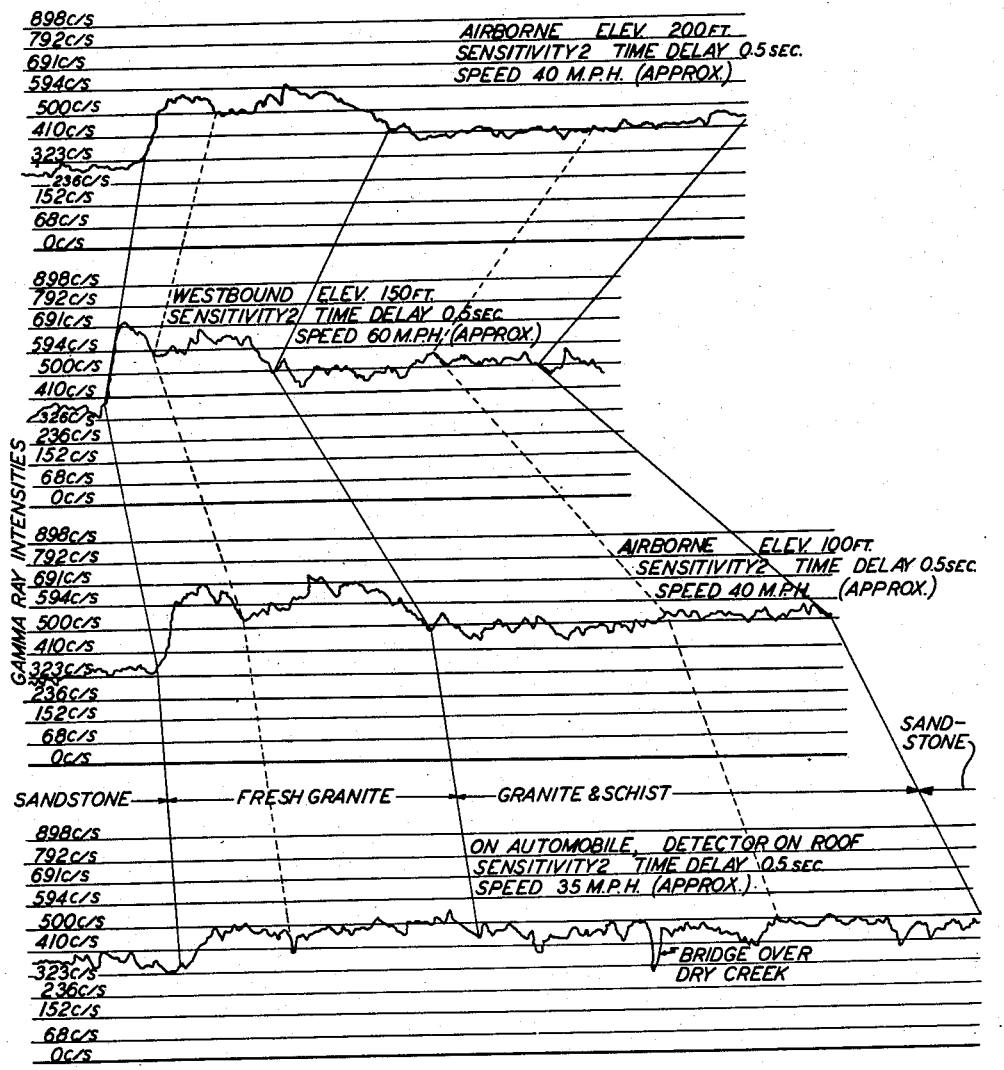

May 11, 1954  G. HERZOG  2,678,398
PROSPECTING
Filed March 19, 1951  8 Sheets-Sheet 8
FIG. 10.
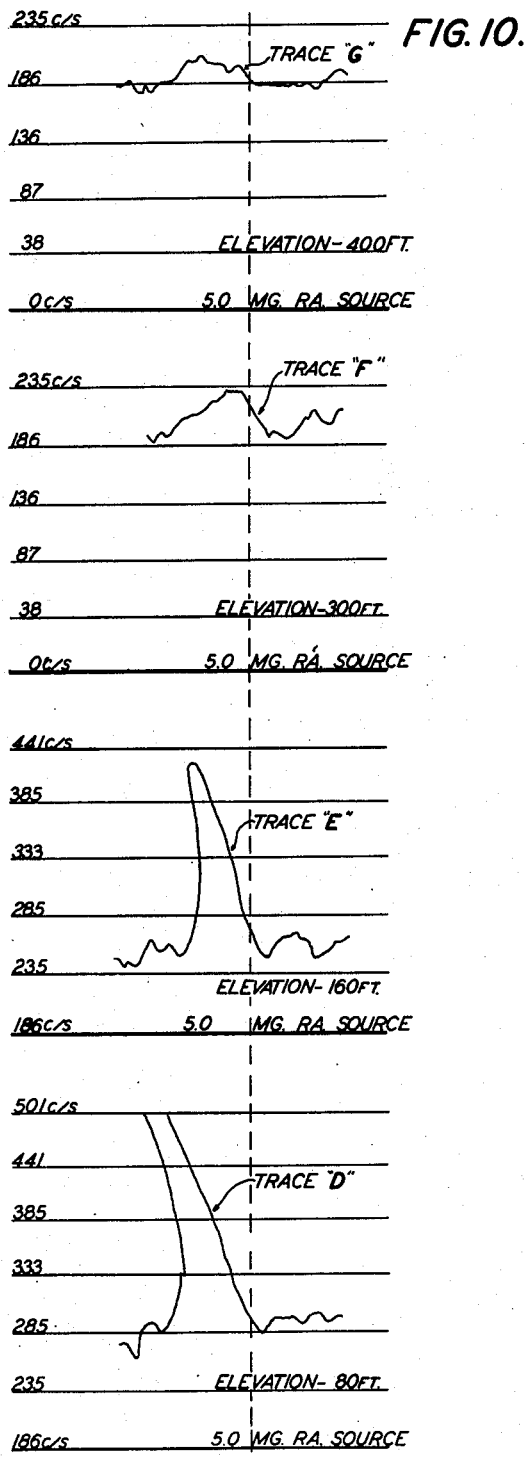
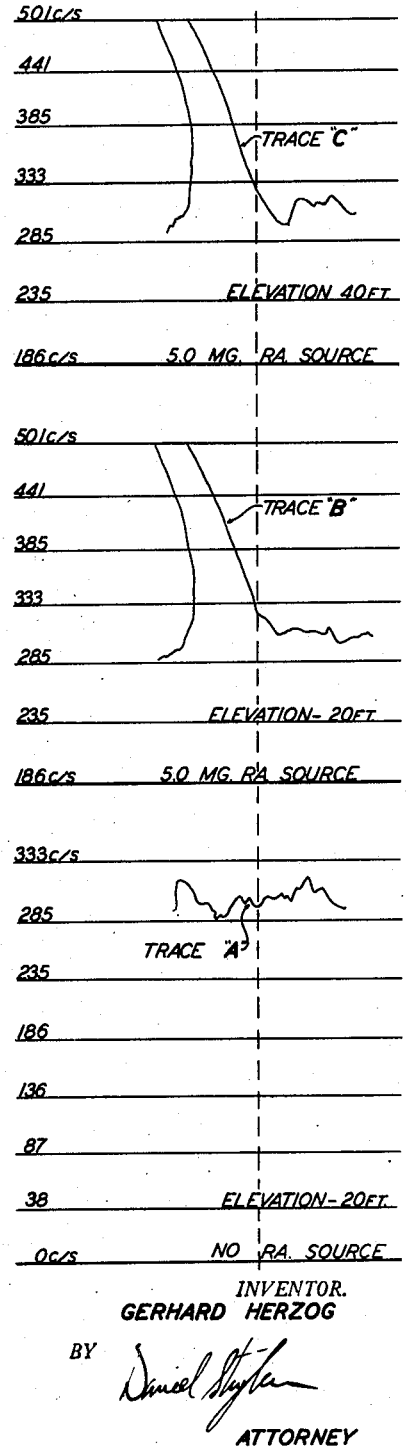
INVENTOR.
GERHARD HERZOG
BY
ATTORNEY Patented May 11, 1954

2,678,398

UNITED STATES PATENT OFFICE 2,678,398

PROSPECTING

Gerhard Herzog, Houston, Tex., assignor to The Texas Company, New York, N. Y., a corporation of Delaware Application March 19, 1951, Serial No. 216,445

3 Claims. (Cl. 250—83.6)

This invention is concerned with prospecting for mineral deposits, particularly metallic mineral deposits, as distinguished from deposits of hydrocarbons such as oil and gas. Although it employs radiation detection, it is especially useful for the discovery and delineation of ore bodies of metals which themselves are substantially non-radioactive. In one aspect, it is useful for surface surveys, both along the ground and airborne, for the discovery and location of geologic features such as faults, contacts, intrusions, etc.

This is a division of my co-pending application Serial No. 13,842, filed March 9, 1948 (now U. S. Patent No 2,562,914, granted August 7, 1951).

Radiation detection has been employed heretofore as a method for distinguishing between different rocks and rock strata, a well known example being the method of gamma ray logging in which a radiation detector such as an ionization chamber or a conventional Geiger-Mueller counter is passed along a bore hole, the counting rates corresponding to the different rock formations penetrated by the hole being observed.

Another practical example of the application of radiation detection in geophysics is the use of portable Geiger-Mueller counters which are moved along the surface of the ground while the counting rate is observed, the object being to discover deposits of strongly radioactive minerals such as those of uranium or radium. If such deposits outcrop or are buried under shallow cover, rays (particularly hard gamma rays) which emanate from the deposit may penetrate to the surface and register at the counter. The presence of such strongly radioactive deposits, if these are not too deeply buried, will thus be manifested by an increase in counting rate.

It is theoretically impracticable to locate buried ore deposits, even though these be highly radioactive, by surveys of radioactivity in the neighborhood of the deposits, except in those cases in which the overburden is so thin that it does not absorb the radiations from the ore deposit to the extent that significant variations in intensity of radiation due to the presence of the deposit are obscured. The naturally radioactive elements emit alpha, beta and gamma rays in various proportions and with different energies. The alpha and beta rays have very little penetrating power. The penetrating power of the gamma rays is higher the absorption of these rays by any surrounding medium is governed by the exponential law. Assuming a reasonable absorption coefficient of 0.1 per cm. for the medium, say rock, a thickness of 23 centimeters will reduce the intensity of the hardest (i. e. most penetrating) gamma rays of thorium C by a factor of 10; 46 centimeters reduces the intensity by a factor of 100; 69 centimeters by a factor of 1000; 92 centimeters by a factor of 10,000; 115 centimeters by a factor of 100,000, etc.

Practically all rocks are radioactive to some extent, and even with the most sensitive of available detectors, an overburden of a few meters reduces the intensity of the gamma radiation to the point where it becomes impossible to recognize the excess activity originating in the ore body over the "background" originating in the overburden. Nevertheless, I have discovered that it is possible to recognize and locate ore bodies through cover in excess of several meters by detecting variations in the intensity of gamma rays originating in the overburden itself, but relating indirectly to the ore body. Thus ore bodies may be revealed through detection of variations of gamma ray intensity at points so far removed from the ore body itself as to be, for all practical purposes, beyond the range at which significant differences of intensity of gamma rays originating in the ore body are detectable. In short, a gamma ray detector if it is sufficiently efficient and is employed for a sufficiently long time at each point where a measurement of gamma ray intensity is made, may be used to discover significant variations in the gamma ray emission at different points in the overburden which, indirectly, reveal the presence of the ore body.

The invention is not restricted to the discovery of ore bodies of the radioactive elements. In fact, it finds its major application in prospecting for ore bodies of non-radioactive metals including base metals such as iron, copper, lead, zinc, cadmium, tin, tungsten, etc., as well as precious metals such as gold, silver and platinum. The country rock or overburden in or under which such deposits occur generally gives significant deviations in gamma ray intensity from which the existence and location of the deposit may be determined. In other words, the deposits have faintly radioactive auras which, if properly detected, act as markers for the deposits, whether or not the deposits themselves are radioactive.

Barren country rocks, i. e. those in which there is no substantial content of commercial minerals, particularly the non-radioactive metallic minerals, are in general radioactive to some extent, and many show radioactivity equal to several micro-micrograms ($10^{-12}$ gms.) of radium per gram of rock. It is the relatively slight differences in this radioactivity, particularly gamma ray intensity, at spaced points in the general neighborhood of an ore body which indicate the presence of the latter. As indicated above, the determination of these differences in reasonable observation times and with detectors of reasonable size, requires the use of detectors having a high gamma ray counting efficiency, several times the efficiency of the conventional Geiger-Mueller counter consisting of a tubular cathode around a wire anode. Such conventional counters have an efficiency of not to exceed about ½%; i. e. they detect on the average only one ray out of 200 received. At this low efficiency significant differences in gamma ray intensities may well be obscured. Gamma rays are emitted sporadically and at random and unless the observation time is long enough the count taken at any point may not be representative of the source. Moreover, even though the counting efficiency be increased or the time made long enough to counteract this tendency to error, significant differences may be obscured by accidental variations including those due to cosmic rays.

To state my discovery in another way, I have determined that it is entirely feasible to discover ore bodies by a method involving the detection of gamma radiation intensity, even though the bodies themselves are buried by overburden so thick that no practicably measurable amount of radiation emanating directly from the ore body penetrates to the surface at which the measurement is taken and even though the ore body be one which contains no material amount of radioactive minerals and would generally be classified as non-radioactive. The invention, in this aspect, is based upon my discovery that the substantially barren country rock or overburden which effectively prevents significant amounts of radiation emanating from the body from reaching the surface, in many cases manifests sufficient variations in gamma ray emissivity to act as a "marker" for the ore body. In other words, even though the ore body itself be substantially non-radioactive or if radioactive, so deeply buried that its emanated rays do not penetrate to the surface in significant amounts, gamma rays emanating from the barren ground (in which the ore body occurs) penetrate to the surface and will, by proper detection, yield an intensity pattern which reveals the ore body. In short, the invention contemplates the improvement in prospecting for deeply buried mineral deposits which comprises locating a related radioactivity anomaly at a remote earth surface by accurately determining the gamma ray intensities along said surface, the term "deeply buried" being employed herein to mean that the deposit is so far removed from the points at which the gamma ray intensity measurements are made that there is no significant variation in the measured intensities due to gamma rays emitted directly from the deposit.

In a series of investigations conducted in a number of mining districts throughout the western United States, including Butte, Montana; Bisbee and Miami, Arizona; Cripple Creek and Climax, Colorado; the Coeur D'Alenes, Idaho; Grass Valley and Idria, California; and the Tintic and Bingham Canyon areas in Utah, it has been determined that useful gamma ray anomalies indicative of a variety of types of mineral deposits may be discovered through the practice of the invention. These anomalies have been found where the country rock in which the ore body occurs is igneous and also in cases in which the country rock is sedimentary. The reasons for the radioactivity of the country rock in the neighborhood of the ore body are not completely understood and may be various, depending upon the manner in which the ore body was formed and its subsequent alteration. The naturally radioactive elements include those of the uranium, thorium and actinium families and potassium. In some instances, radioactivity in the country rock adjacent to an ore body may be due to introduction of one or more of these elements at the time the ore body was formed, say by magmatic intrusion. In other cases, it may be due to radon, actinon, or thoron which penetrated the rock subsequently either in gaseous state or in solution in water. Whatever be the reasons, the radioactivity of the country rock and the variations in this radioactivity are sufficient to enable discovery and delineation of associated ore bodies in a great variety of cases.

Theoretically, perhaps, a gamma ray detector of any efficiency might be employed for the detection of deeply buried deposits through the detection of gamma ray anomalies originating in the overburden, provided that a sufficient time were allowed for each reading. With ordinary detectors, however, this time is so long as to be completely impractical, and if less than the required time is taken, the readings will be without significance. As already noted, the conventional Geiger-Mueller counter consisting of a tubular cathode disposed around an anode wire has a detection efficiency for gamma rays of approximately ½%. At this efficiency, the time required for each observation becomes a matter of hours and even then the results may be vitiated by accidental variations. Consequently, from a practical standpoint, a detector having a considerably higher counting efficiency for gamma rays only, say a crystal type of detector should be employed.

Any type of gamma ray detector may be employed for the discovery of auras of mineral deposits through the practice of the invention, provided that the gamma ray intensities to be measured are sufficiently high and differ greatly from point to point along the traverse being prospected, and provided further that sufficient time is employed for each reading. In the majority of instances, however, the gamma ray intensities to be measured (and more especially the significant differences in gamma ray intensity to be determined) are small, so that special equipment is desirable.

Generally speaking, ionization chambers are less desirable than tube counters, for example Geiger-Mueller detectors, in the practice of the invention. In turn, conventional Geiger-Mueller counters are not as suitable as other types of detectors, which have a higher counting efficiency for gamma rays and substantially the same efficiency for all other types of radiation. Thus the crystal type of detector (employing a diamond or some other gamma ray-sensitive crystal as a detecting element) or detectors of the type described and claimed in U. S. Patent No. 2,397,071, granted March 19, 1946, are presently preferred.

Since, in general, the gamma ray intensities to be measured are of a low order, counting rates tend to be small. The counting rates may be increased by employing a single Geiger-Mueller detector of large size, i. e. by increasing active counter volume, but counting rate as well as efficiency of detection may be increased by increasing cathode area in the Geiger-Mueller detector, for example, by employing a bundle of Geiger-Mueller detectors (preferably disposed in a single envelope as is disclosed, for example, in the pending application of Donald G. C. Hare, Serial No. 654,272, filed March 14, 1946). Other factors being equal, it is better to employ a number of small Geiger-Mueller detectors connected in parallel than a single such detector of equivalent active volume, since in this way the advantages of increased cathode area and increased active volume are obtained.

As indicated above, a Geiger-Mueller detector consists essentially of a tubular cathode and a coaxial wire anode running through it. The two are enclosed in an envelope within which a suitable gaseous atmosphere (say a mixture of argon and alcohol) is maintained, usually at a subatmospheric pressure. Normally the potential difference between the cathode and the anode is nearly, but not quite, high enough to cause a discharge to take place. If an ionizing ray passes into the detector a discharge may take place with resultant current flow. The discharge ceases after a short period of time, after which the counter is again in condition to register or "count" ionizing rays.

For all except gamma radiation, the Geiger-Mueller counter is highly efficient. It will detect alpha and beta radiations and the penetrating particles of cosmic rays with substantially 100% efficiency. However, its efficiency for gamma radiation is low, say only ½% or on the average only 1 out of each 200 gamma rays entering its active volume triggers the counter. We have discovered that for the location in a surface survey of the faint differences in gamma ray intensities that are indicative of most deeply buried ore deposits, as well as most contacts, faults, and similar geologic features, the survey should be made with a detector which has a substantially higher efficiency for gamma rays than the conventional Geiger-Mueller detector (preferably at least 4 or 5 times) and substantially the same efficiency as the conventional Geiger-Mueller for all other radiation. Ionization chambers do not serve this purpose, but crystal type detectors (which employ a crystal, such as a diamond that becomes momentarily conductive upon the entry of radiation and permits the passage of current), detectors employing a fluorescent screen of napthalene to obtain scintillations which are measured by a photomultiplier tube and detectors of the multiple cathode plate type, as described and claimed in U. S. Patent No. 2,397,071, granted March 19, 1946, are well suited to the practice of this aspect of the invention. Thus my invention contemplates the conduct of a survey along or above the earth's surface by measuring the gamma ray intensities at a series of points on or above the surface with an efficiency substantially greater than that obtainable with a conventional Geiger-Mueller counter while simultaneously measuring together with the gamma radiation intensity, the intensity of other radiation present but with substantially the same efficiency as that obtainable with the conventional Geiger-Mueller counter. In this way faint differences in gamma ray intensity which are indicative of geological features such as faults, contacts, mineralized zones, etc., may be detected with airborne instruments at elevations up to at least 800 feet above the earth while moving at high velocity.

A further explanation of the advantages of the employment in surface surveys, and especially surveys conducted at substantial elevation above the surface, of a detector having the characteristics described above is given hereinafter.

These and other aspects of the invention will be clearly understood in the light of the following detailed description, taken in conjunction with the accompanying drawings, in which:

Fig. 1 is a graphical comparison of counting rates of a conventional Geiger-Mueller counter and a preferred counter for the practice of the invention;

Fig. 4 is a graph showing the results of a horizontal underground survey in a limestone cut by porphyry dikes and a zinc replacement type deposit;

Fig. 5 is a graph of the results of an underground survey along a cross-cut through porphyry sills and lead-zinc replacement deposits occurring in quartzite;

Fig. 6 shows the results of an underground survey through granite cut by a zinc-copper vein indicated by a positive anomaly and a zinc-lead vein indicated by a negative anomaly;

Fig. 7 illustrates a strong positive anomaly encountered in an underground survey across a zinc vein occurring in granite;

Figure 2:
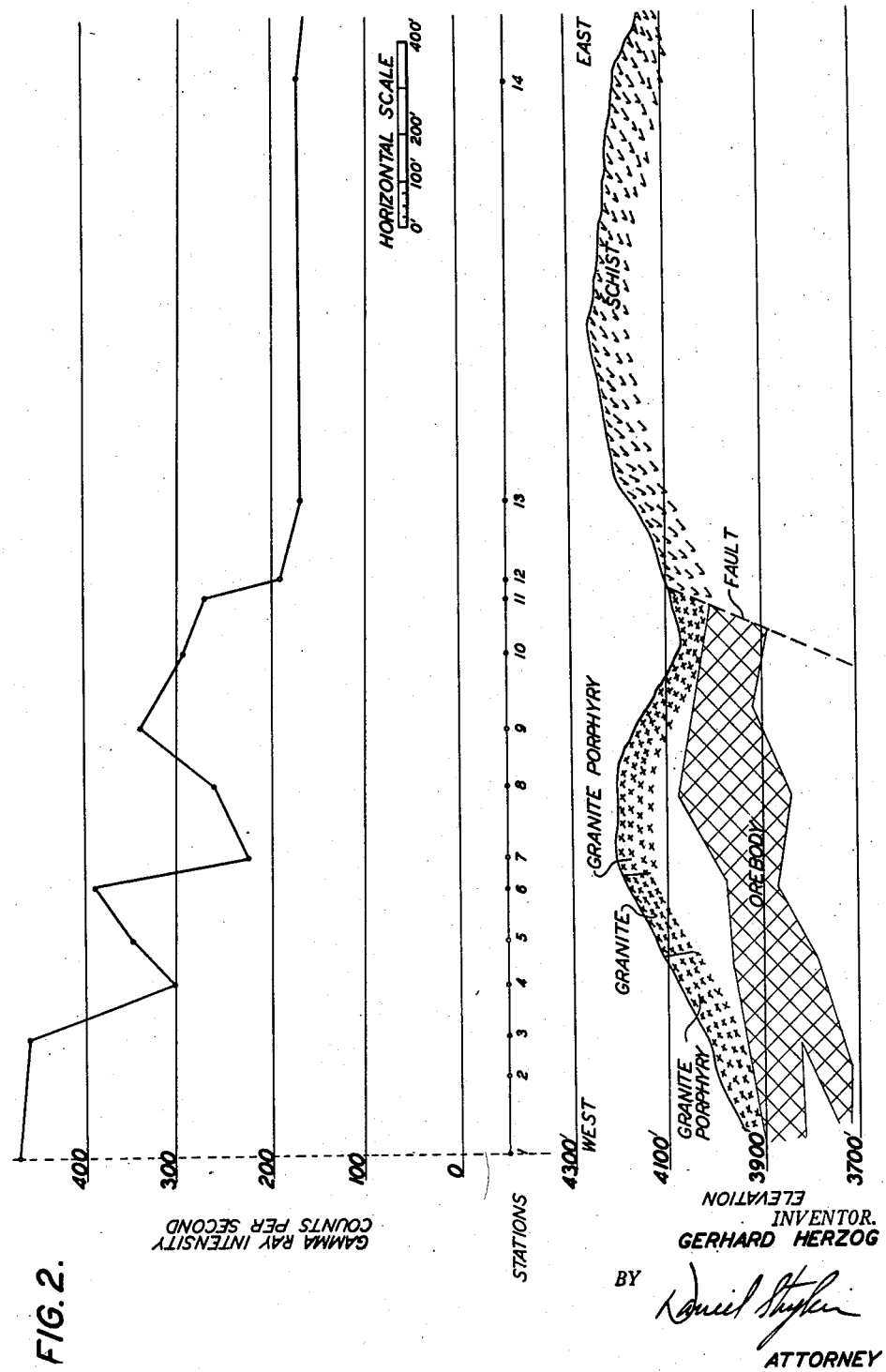
Fig. 2 is a graphic representation of a surface survey made in accordance with the invention over a buried copper deposit of the massive disseminated type.

Fig. 8 gives a comparison of survey results with airborne equipment flown at various elevations across a granite plug occurring in sandstone;

Fig. 9 gives a comparison of survey results with equipment flown at various elevations and carried along the surface across the granite plug of Fig. 8;

Fig. 10 illustrates the effect of a radioactive survey marker employed to correlate survey results with terrain in airborne operations at various altitudes;

Fig. 11 is a diagram illustrating a preferred mounting arrangement for a battery of detectors employed in a surface survey with a vehicle or the like; and Figs. 12 and 13 show modifications of the mounting arrangement of Fig. 11.

Substantially any radiation detector which is sensitive to gamma radiation will also detect alpha and beta radiation and other radiation such as the penetrating particles of cosmic radiation. In fact, detectors in general have a higher efficiency for other types of radiation than for gamma rays. In geophysical prospecting employing radiation detectors, the gamma radiation is detected along with other radiation, some of which originates in the detector itself because of contamination of the materials employed in the construction of the detector and some of which is cosmic radiation, which has components so penetrating that they are encountered in mines, etc., several thousand feet below the surface. Hereinafter, the detected radiation other than gamma radiation is referred to as "background," and this background because it is emitted sporadically and at random and also because of its relatively high intensity may well obscure significant variations in gamma ray intensities between different points along a traverse and under the most favorable conditions reduces the contrast between readings obtained at different points. I have discovered that with certain types of radiation detectors the efficiency for detection of "background" does not increase proportionally to the increased efficiency of the detector for gamma rays, with the result that as the detection efficiency for gamma rays is increased, a greater contrast between readings is obtained and there is less chance that small but significant variations in gamma ray intensity from point to point along or over the earth's surface will be vitiated by variations in background, particularly cosmic rays. As already indicated, two of these certain types of radiation detectors are the crystal type and the type employing a multiplicity of cathode plates disposed transverse to one or more anode wires which pass through apertures in the plates. The virtues of a detector of this type over a conventional Geiger-Mueller counter have been demonstrated in comparative tests. The results of these tests are illustrated in Fig. 1, which is a plot of counting rates obtained with a conventional Geiger-Mueller counter at a series of points along traverses on the earth's surface against the counting rates obtained at the same points with a multiple plate type of counter having 12% less active volume due to minor differences in length and diameter. The observed counting rates of the multiple plate type of counter (hereinafter called the T counter) are plotted as ordinates against the counting rates with the Geiger-Mueller counter plotted as abscissa.

All the points fit very closely to a straight line relation. The straight line, which is shown in Fig. 1, was calculated with the method of least squares. If T and G are the counting rates per second for the T counter and for the Geiger-Mueller counter respectively, the equation for the straight line is:

$$T = 4.945 \quad (G - 10.843) \tag{1}$$

Theoretically one should expect a relationship between T and G according to Equation 2.

$$T - t = K \quad (G - g) \tag{2}$$

where $t$ and $g$ are the constant background rates for the T counter and the Geiger-Mueller counter, respectively. The difference T minus $t$ on the left side of the equation is then the counting rate due to the gamma rays from the ground alone. Similarly, the difference G minus $g$ is the counting rated due to gamma rays alone for the Geiger-Mueller counter. Equation 2 expresses that the gamma ray count for the T counter is a multiple of the count for the Geiger-Mueller counter. Accordingly, K is the relative efficiency to gamma rays of the T counter as compared to the Geiger-Mueller counter. Equation 2 can be rewritten in the form of Equation 3.

$$T = K \left[ G - \left( g - \frac{t}{K} \right) \right] \tag{3}$$

The experimental relation as expressed in Equation 1 has the same form as has Equation 3 and by comparison it appears that the relative efficiency of the T counter compared to the Geiger-Mueller counter is 4.945. The difference $g$ minus $t$ divided by K must be equal to 10.843. By substituting the letter C for the value 10.843 in Equation 1 one arrives at Equation 4.

$$C = g - \frac{t}{K} \tag{4}$$

This equation can be written as follows:

$$t = K \quad (g - C) \tag{5}$$

showing that the background $t$ for the T counter is not equal to a multiple K of the background $g$ of the Geiger-Mueller counter. One has to subtract the value C from $g$ and then multiply with the efficiency K in order to get the background $t$.

The T counter had a volume which is 12% smaller than the Geiger-Mueller counter. This changes the constants of Equation 1 to those in Equation 6.

$$T = 5.54 \quad (G - 9.97) \tag{6}$$

or in other words the relative efficiency is approximately $K = 5.5$ and the constant C is equal to 10 counts per second.

The background counts $t$ and $g$ each consist of two parts, which shall be indicated by an index $o$ and an index $c$. $t_o$ and $g_o$ shall be that part of the respective backgrounds which is caused by gamma rays. These gamma rays are partly due to contamination of the metal parts of the counters. It is proper to assume that the number of contamination gamma rays is equal for the two counters. Because of the higher efficiency of the T counter in detecting gamma rays the background count due to the gamma rays $t_o$ will be K times $g_o$. The second part of the background $t_c$ and $g_c$ is due to directly ionizing particles such as penetrating particles of cosmic rays and of alpha rays which are emitted by the metal. Since the cosmic ray contamination for the T counter would be somewhat less than for the Geiger-Mueller counter due to the smaller cross-sectional area of the T counter, and since the alpha ray contamination for the T counter would be somewhat more than for the Geiger-Mueller counter due to the larger amount of metal in the cathode of the T counter, it can be assumed in good approximation that $t_c$ is equal to $g_c$. These relationships are expressed in Equations 7 to 10.

$$t = t_o + t_c \tag{7}$$

$$g = g_o + g_c \tag{8}$$

$$t_o = K \times g_o \tag{9}$$

$$t_c = g_c \tag{10}$$

Combining Equation 5 with 7 and 8 one obtains Equation 11.

$$t_o + t_c = K \quad (g_o + g_c - C) \tag{11}$$

By inserting values 9 and 10 into Equation 11 one obtains Equation 12.

$$K \times g_o + g_c = K \quad (g_o + g_c - C) \tag{12}$$

and finally the relationship 13.

$$g_c = \frac{K \times C}{K - 1} \tag{13}$$

By inserting the numerical values for K and C into 13 one obtains for $g_c$ the value 12.2 counts per second.

$$g_c = 12.2 \text{ cts./sec.} \tag{14}$$

This figure then represents that part of the background for the Geiger-Mueller counter which is due to directly ionizing rays.

From cosmic ray measurements it is known that the counting rate due to cosmic rays is approximately one count per minute per square centimeter of counting area. The counter in question had a cross sectional area of 700 square centimeters. One may expect, therefore, a counting rate of approximately 700 counts per minute due to cosmic rays alone or a counting rate of 11.5 counts per second. This value agrees very well with the one which are calculated from the field observations and which is reported in Equation 14, and supports quite strongly the validity of the calculations made above.

The foregoing calculations show plainly that the background of the T counter (which is described more fully in U. S. Patent No. 2,397,071) does not increase proportionally to the increased efficiency for gamma rays. This is emphasized by the following tabulation of counting rates:

| T = 50 | 100 | 150 | 200 | 250 |
| G = 21 | 31 | 41 | 51 | 61 |
| 5.5×G =115 | 170 | 225 | 280 | 335 |

The second line gives the observed counting rates with the Geiger-Mueller counters for the counting rate which is listed in the first line for the T counter. In the third line are the values which would be obtained if $K=5\frac{1}{2}$ Geiger-Mueller counters were used simultaneously. From the first and the last column it is apparent that the counting rate for the T counter increases by a factor 5, whereas the counting rate for $5\frac{1}{2}$ Geiger-Mueller counters increases only by a factor of 3. In other words, let us assume that there are two regions in the field, one of which shows a low counting rate and the other one a high counting rate. In the first region the T counter gives a rate of 50 and in the second region a rate of 250 counts per second. The T counter, therefore, shows a contrast by a factor of 5. If one now measures the same locations by using simultaneously $5\frac{1}{2}$ Geiger-Mueller counters each one of which has the same active volume as the T counter one finds in the first place a counting rate of 115 and in the second location one of 335 counts per second. The aggregate of the $5\frac{1}{2}$ Geiger-Mueller counters, therefore, indicates a contrast which is slightly less than 3. This indicates clearly that the T counter has advantages which cannot be made up by using a large number of Geiger-Mueller counters.

In underground gamma ray surveys, the cosmic ray effect and hence the background, is diminished substantially by absorption in the overburden. However, in surface surveys (as shown by Fig. 1) the cosmic ray effect is high and in airborne surveys the background due to cosmic rays is even higher, and the tendency to obscure slight differences in gamma ray intensities from point to point is greater. This tendency may be overcome and satisfactory results obtained by employing a detector of the type just described, or any other type which has a substantially higher efficiency for gamma rays than the conventional Geiger-Mueller detector and in which this increased efficiency is obtained without increasing proportionately the counting rate for background. Hence anomalies in surface surveys that cannot be detected in reasonable time or reliably with Geiger-Mueller counters, even though a bundle of these are employed to increase cathode area and counting rate, may be detected with the multiple plate or crystal types of detectors.

From the foregoing, it is apparent that the multiple plate type of detector may be constructed with an efficiency for gamma rays of approximately 2.5% or say five times that of the conventional Geiger-Mueller counter.

If the relative accuracies of the T counter and the Geiger-Mueller counter are considered as they affect the useable portion of the total counting rate observed, it is readily apparent why the results obtained with the T counter are more accurate than those obtained with the Geiger-Mueller counter, even though a longer observation time is employed in using the Geiger-Mueller counter.

Assume the application of a T counter and a Geiger-Mueller counter of equal active volumes and a reading time for each which will result in the same number of total counts observed. This will give readings which are subject to the same probable statistical error as applied to the average counting rates observed. However, due to the lower efficiency for gamma rays of the Geiger-Mueller counter, this probable error is a much larger percentage of the useable counting rate (the observed counting rate with the background subtracted) than is the case with the higher efficiency T counter where the useable counting rate is a much larger portion of the total counting rate observed.

The invention, as applied to the location of buried mineral deposits through the discovery of radioactive anomalies associated with the country rock, contemplates underground, surface, and airborne operations employing any type of detector of requisite size and efficiency. Especially in underground operations, where the gamma ray intensities may be relatively high, Geiger-Mueller counters are sometimes useful. In surface and airborne surveys for the detection of faint anomalies characteristic of some mineralized zones as well as some faults, contacts, etc., i. e. when the invention is applied as an aid in geological mapping, the invention contemplates the use of the high efficiency counters already described.

Either positive or negative gamma ray anomalies may characterize a buried ore body. In some cases the country rock is more radioactive than the ore body and as the latter is approached the intensity of detected gamma radiation decreases. This is considered a negative anomaly, the reverse case in which gamma ray intensity increases as the ore body is approached being considered a positive anomaly.

A positive anomaly discovered in a survey of a deeply buried disseminated copper deposit in Arizona is illustrated in Fig. 2. In this survey a single multiple plate-multiple wire detector was employed. The envelope was a gas tight brass cylinder 15" long and 3" in diameter. The cathode plates were silver and were grounded to the envelope. There were 65 such plates, each .010" thick and spaced on $\frac{3}{16}$" centers with their major surfaces perpendicular to the cylindrical axis. Seven tungsten anode wires (.005" dia.) were passed through $\frac{1}{2}$" holes in the plates. At each station the detector was laid approximately flat on the ground and 8000 counts were taken, the average probable statistical error for such a length of count being $\pm\frac{3}{4}\%$.

In all cases except stations 7 and 8 where the top of a hill had been flattened with a bulldozer, the stations were on substantially undisturbed ground, i. e. bed rock.

Consideration of the plot of gamma ray intensities, beginning at the right, shows substantially uniform and relatively low values over the schist. The contact of the schist with the granite porphyry is shown by an increase in intensity. Save for the readings at stations 7 and 8 (which may be less reliable than the others due to the disturbed surface), the intensities increase markedly as the depth to the ore body decreases with a strong increase in intensity at the left where the ore body is close to the surface. It will also be apparent that the detector distinguished between the granite and the granite porphyry of the overburden.

Figure 3:
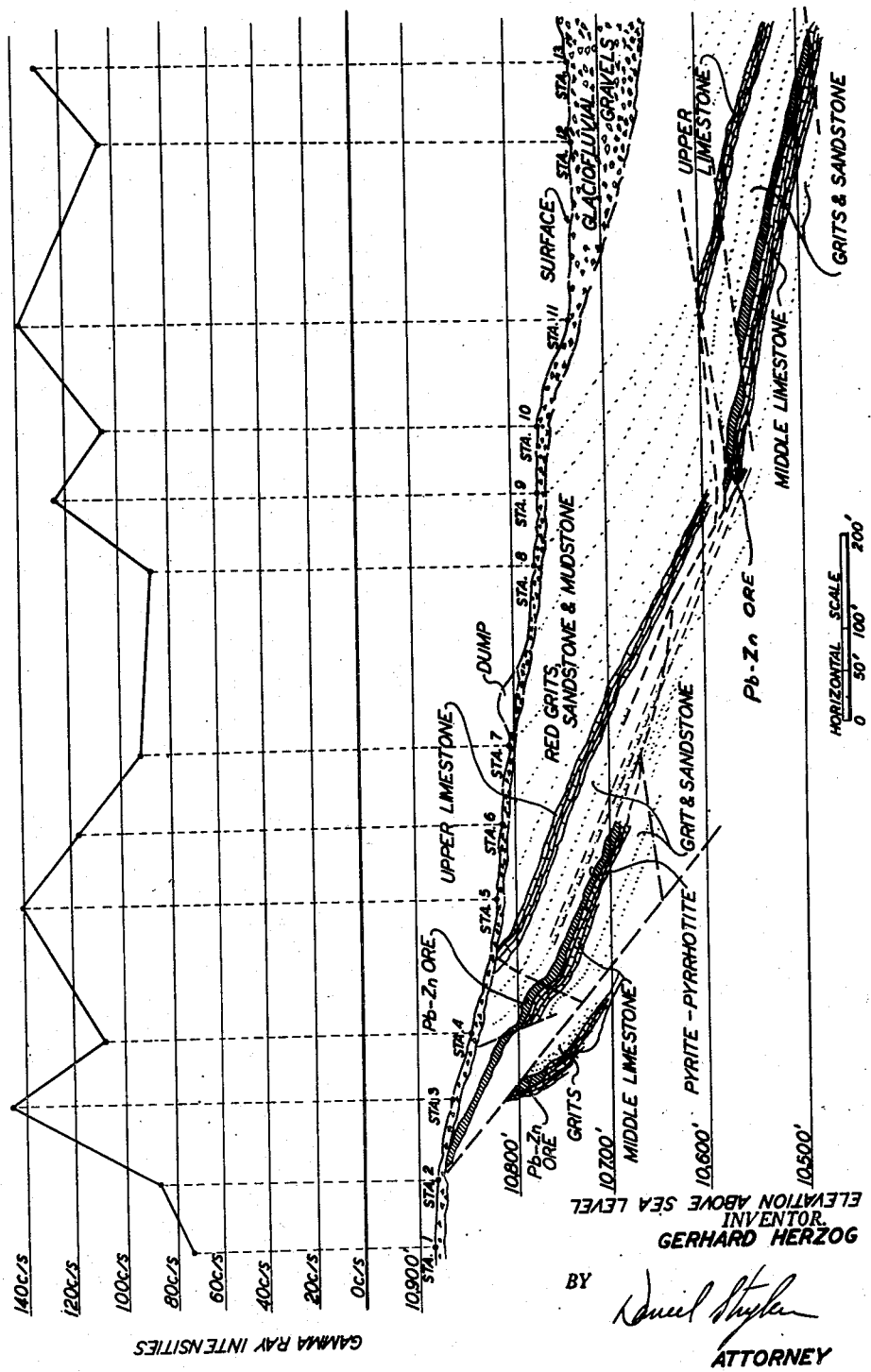
Fig. 3 is a similar representation of a surface survey made over a series of buried replacement type lead-zinc deposits.

Fig. 3 is a vertical geological section through a mineralized zone in Colorado with a graph of intensities observed at a series of stations on the surface above the section. In this work a single 3" diameter by 15" long multiple plate-multiple wire detector (similar to that used in the survey of Fig. 2) was employed. The ore bodies underlying the traverse are sulphide replacement deposits occurring along bedding planes in limestone. The limestones are interbedded with sandstones, grits and mudstones and there are several post-mineralization faults as shown. The rocks of the section are covered throughout by glaciofluvial gravels of varying depth and at no point is there a surface exposure of the ore.

The survey was begun on the uphill side of the section (the left side in Fig. 3). The first station was above unmineralized limestone overlain by gravel and a low intensity level of about 70 counts per second was registered. The second station is still to the left of the first ore body but the count at this point is substantially higher. The next four stations overlie the upper lead-zinc sulphide deposit, which is overlain at one point by a deposit of pyrite and pyrrohotite. All of them are points of high intensity, as is the next station (No. 6). Having in mind that the ore of this first body is nowhere closer to the surface than ten feet and is over 100 feet below the surface at station No. 6, it is plain that the detector is beyond the range of detectable differences of gamma radiation originating in the ore body. This indicates the presence of a radioactive aura in the country rock overlying the body.

A second ore body of lead and zinc sulphide underlies the surface at the right of the section by depths in excess of 200 feet. Its presence is indicated by an increase in gamma ray intensity at stations 9, 10, 11, 12, and 13, which overlie it, the unmineralized zone between the two bodies being characterized by low intensities of stations 7 and 8.

Fig. 4 shows the results obtained in a horizontal underground gamma ray survey conducted along a crosscut in limestone in an Arizona mine. Three different limestones were crossed, as shown. A replacement deposit of zinc sulphide ore occurs in one of the lime formations and another one is cut by poryphyry dikes. A marked aura occurs in limestone A in the neighborhood of the dikes, i. e. there is a marked increase in gamma ray intensity from this lime at a substantial distance, i. e. in excess of 50 feet, from the dike.

An even stronger positive anomaly is associated with the zinc deposit which occurs close to a contact between the limestone B and limestone C. This anomaly is detectable at a distance of almost 200 feet to the left of the deposit in limestone B in which it occurs but is less evident to the right, possibly because station No. 14, at which the intensity is relatively low, occurs almost on the contact between limestone C and limestone B. In other words, the contact or interface may have retarded the migration of gamma ray sources toward the right.

The survey illustrated in Fig. 4 was conducted with a 3" x 15" multiple plate multiple wire detector similar to that used in the survey of Fig. 2, the points of highest intensity being checked with a smaller multiple plate single wire detector 2" in diameter and 4" long. The detectors were stationary and substantially vertical in the center of the cross-cut at each station.

Fig. 5 illustrates an underground survey in a Utah mine in which lead-zinc sulphide deposits have replaced thin limestone beds in quartzite, with porphyry sills intruded along the bedding planes and generally parallel to the ore bodies. In this work a single small multiple plate detector was employed (2" diameter, 4" long) with 12 lead plate cathodes and a single coaxial tungsten anode wire. The porphyry sill, as might be expected of an acid intrusive, shows a marked positive anomaly, its aura in the quartzite being apparent at least 40 feet away. The vein on the left likewise is accompanied by a strong positive anomaly which is apparent in the quartzite at a substantial distance, indicating again the presence of an aura. Having in mind that in many cases exploration openings have missed valuable ore bodies by a matter of a few feet, the ability to locate an aura of a deposit, and thus in effect "see" through the intervening rock, is an extremely valuable aspect of the invention.

Figs. 6 and 7 illustrate actual underground gamma ray surveys made in accordance with the invention in a Montana mining district. In these surveys a single detector was employed with a metallic envelope 2" in diameter and 10½" long. It was provided with 51 silver cathode plates spaced as in the case of the apparatus employed in the survey of Fig. 2 and with a single coaxial anode wire of tungsten. The surveys were made along crosscuts about 2000 feet underground. In both cases the country rock was granite.

To consider Fig. 6, the gamma ray intensities beginning in the granite at the left are relatively high. In the neighborhood of the slight stringers of zinc ore a marked negative anomaly is encountered. Immediately thereafter, however, the country rock to the left of the zinc-copper vein gives a high intensity which increases markedly as this vein is passed and then drops to the intensities observed in the unaltered granite. Continuing to the right, another sharp negative anomaly appears in the neighborhood of the zinc-lead vein.

The relationship of the stations at which the readings were taken to the position of the veins is shown at the bottom of Fig. 6. From this relationship it will be plain that the anomalies appear in the country rock well outside the veins.

Fig. 7 illustrates a traverse across a zinc vein which shows a marked positive anomaly. This anomaly is apparent in the country rock on both sides of the vein, as well as in the vein itself and illustrates clearly a situation in which the detector can apparently "see" the vein through several meters of granite, although what is actually being detected is the aura in the country rock, in this case granite, which lies adjacent to the vein.

One of the important fields of application of the invention is in surface reconnaissance, the detector being moved along the traverse continuously with continuous integrated observations. An efficient detector together with the associated power supply, preamplifier, amplifier, integrating circuit, registering meter, etc., with a total weight of less than 40 pounds has been constructed, and this unit may be carried by an observer walking along the traverse, a continuous indication of gamma ray intensities along the traverse thus being obtained. Larger detectors having a higher counting rate may be truck-mounted or airborne and anomalies have been detected while moving the detector along the traverse at speeds up to 200 miles per hour and at elevations up to more than a thousand feet.

All things being equal, greater contrast is obtained, i. e. the detection of significant anomalies is more pronounced, if the detectors are carried along the traverse at a substantial distance above the ground, improvement in result being obtained as the distance is increased up to a height of about 150 feet, above which results become less satisfactory and more difficult to interpret.

A number of comparative surveys have been made in which the detectors were first mounted in a truck and run along the traverse and thereafter flown across the traverse in a helicopter at different elevations. In this work six large multiple plate-multiple wire detectors were employed. Each was 3" in diameter and 30" long and they were mounted side by side to form a panel. Each detector contained 136 silver cathode plates .010" thick mounted on $\frac{3}{16}$" centers and 7 tungsten wire anodes (.005" dia.) passing perpendicularly through ½" diameter holes in the plates. Each detector was separately preamplified and quenched, the outputs of the several preamplifiers being sent to an electronic mixing circuit, which in turn fed a single amplifier. The output of this amplifier was integrated, and recorded by an electronic voltmeter. The integrator employed was so designed that its time constant, i. e. the time over which the input pulses were averaged, could be varied.

In the airborne and truck surveys, as will presently appear from a discussion of Figs. 8 and 9, it was found that optimum results were obtained while flying at an elevation of 100 to 200 feet above ground, a height of about 150 feet being best. Extremely useful results however were obtained up to heights of 800 feet while flying over anomalies of relatively low gamma ray intensity. These effects of height upon result appear to be due to the interplay of a number of factors: viz.

1. At low altitudes above ground, i. e. less than about 75 feet, slight differences in the altitude, encountered for example when the instrument is carried over a ditch, cause marked deviations in recorded intensity. Since these deviations are not related to the geological features being investigated, they tend to obscure results. Above about 75 feet, these effects are less pronounced and hence there is less requirement for the pilot to attempt to fly at constant elevation above ground.

2. As height is increased, cosmic ray background increases and the intensities of gamma rays from the ground decrease, so that at above, say 800 feet, significant changes in gamma ray intensity due to geological differences to be discovered tend to be obscured unless they are very pronounced. As altitude increases, the path of the gamma rays through the air lengthens. This in turn reduces the intensity due to absorption by the air.

3. As height is increased, gamma ray intensity from any given point in the earth's crust decreases according to the inverse square law, but at the same time the area from which the detector receives gamma radiation increases. These factors oppose each other, so that the inverse square law is not the sole controlling factor.

4. At low elevations, radiation emanating from a buried source off to one side of the detector has to pass through a relatively long path in high density overburden with consequent high absorption and marked decrease in intensity. As elevation above ground is increased the path through the overburden decreases, the net result being that this radiation may have a greater effect on the measurement, even though the total distance that the radiation travels through ground and air (which because of its low density has low absorptive power) is increased.

In the light of the foregoing, it would appear that even when the detector is carried along the surface at substantially constant distance above ground by animal or vehicle, and even when readings are made above the surface with the detector stationary, advantages accrue to increasing the elevation of the instrument above ground. Hence it is better to mount the detector above a truck rather than below and still better to mount the detector so that screening effect of the truck is minimized.

Several preferred mounting schemes for ground borne detectors are illustrated in Figs. 11 to 13.

Referring to Fig. 11 it will be seen that a panel of multiple plate-multiple anode detectors are mounted on a support above a vehicle, say an automobile, with their major axis (as defined by the anodes of the detectors) substantially parallel to the direction of travel of the vehicle. They are mounted sufficiently high above the vehicle, say 3 or 4 feet, that the absorption effect of the vehicle on gamma rays emanating from the surrounding terrain is reduced while the ground area from which the detectors receive gamma radiations is increased. The detectors are so disposed that their maximum cross sectional area is disposed approximately parallel to the path of travel and in a substantially vertical plane, so that they intercept gamma radiation from the sides of the traverse.

Fig. 12 illustrates a modification of the arrangement of Fig. 11, in which the detectors are broken into two separate panels of three each disposed respectively on the two sides of the vehicle but electrically connected as already described with separate preamplifiers feeding a common mixer.

Fig. 13 illustrates another modification of the arrangement of Fig. 12 in which the axes of the detectors are vertical, the arrangement being otherwise the same.

All three of the foregoing arrangements are advantageous in surveys conducted over undisturbed surfaces and also along established roads, where fills, pavement, etc., may tend to obscure results. They permit increased reception from undisturbed terrain along the side of the road and thus tend to improve reliability of result.

A comparison of results obtained with automobile mounted and airborne detectors employed to traverse a granite plug occurring in sandstone in Texas is given in Fig. 9. The lowest trace on this figure was obtained with the panel of six detectors mounted horizontally on the roof of an automobile driven along the traverse at a speed of about 35 miles per hour. The other traces were obtained with the same panel of detectors mounted in a helicopter and flown along the traverse at the elevations and speeds indicated for each trace. In all cases the "time delay" i. e. the integration constant of the integrating circuit interposed between the amplifier and the recorder was the same, so that the results are directly comparable.

To consider the lowest trace, obtained with the detectors mounted on the automobile, and beginning on the right, it will be seen that the contact between the sandstone and the granite and schist occurring on the right of the plug is marked by a substantial increase in intensity of gamma rays. The contact between the granite-schist and the fresh granite is less marked but is distinguishable as a small negative anomaly, whereas the contact between the fresh granite and the sandstone at the left of the figure is marked by a sharp decrease in intensity as the detector passes toward the sandstone. This trace shows clearly the pronounced effect of surface features on the detector at low elevations. Thus when the detectors were carried across a bridge over a dry creek bed, so that their distance above ground increased a few feet, there was a sharp drop in intensity. The survey which the lowest trace represents was made along a paved highway, and it is to be expected that better results might be obtained over undisturbed ground, although not as good as those obtained with the airborne instruments.

The trace obtained when the detectors were flown across the traverse at an elevation of about 100 feet has the same general shape as that of the trace taken immediately above ground level. In general, however, the trace at 100 feet is smoother and non-significant variations in intensity (such as that due to the dry creek) are less pronounced, so that the significant deviations representative of geological features are easier to detect. For example, at 100 feet the contrast between granite and sandstone and that between granite and granite-schist are substantially greater.

The trace obtained at 150 feet above ground is still better than that obtained at 100 feet, despite the fact that the speed of travel was considerably greater (i. e. 60 M. P. H.). Thus the trace is in general smoother, insignificant variations being minimized while the indices of the contacts between rocks are more easily recognized. So, although the trace has the same general shape as those taken at the lower elevations, the several formations are more sharply defined and there is less "hash" on the trace.

At an elevation of 200 feet, as shown by the upper trace, the several formations are still sufficiently defined to be identified. However, contrast between formations has in part been lost, and the trace is not so easy to interpret as that made at 150 feet above ground.

Fig. 8 continues the comparison of traces made with airborne detectors at different elevations across the same granite plug surveyed in Fig. 9. The detection equipment and the aircraft were the same as in the operations illustrated by Fig. 9, but a different time delay, i. e. integration constant was employed in recording the traces. Surveys were run at elevations of approximately 100, 200, 400, and 800 feet above ground at approximately the same air speed (35 M. P. H.). The four traces thus obtained are shown. All of the traces follow the same general pattern, but as elevation is increased minor and insignificant variations tend to be removed. The traces at 100 and 200 feet show the greatest contrasts for the several geological formations and features to be identified, but differences between the sandstone and the fresh granite, between the granite and the granite-schist and between the granite-schist and the sandstone are still apparent at 400 and 800 feet. In short, Fig. 8 shows that the optimum altitude for airborne gamma ray surveys in accordance with the invention is between about 100 and 200 feet, but that useful results, even with relatively low intensity anomalies, can be obtained up to 800 feet. In still other tests, flown in an airplane, as distinguished from a helicopter, and at much higher speeds and elevations, high intensity anomalies (such as a shore line where there is a strong contrast between gamma ray intensities emitted by land and water) were detected clearly. Eight hundred feet, therefore, is not necessarily an upper limit of usefulness of the invention, although it is well above the optimum elevation of about 150 feet, at which height the effects of deviations in elevation above ground are less pronounced, and less care need be taken in maintaining constant this elevation.

In airborne surveys conducted in accordance with the invention it is essential that the traces obtained, say those of Figs. 8 and 9, be correlated with the terrain over which the survey is made. This may be done in several ways.

One simple way is to provide an automatic time marker in the recorder, so that the time each portion of the trace is recorded is known. The operator of the detector notes the exact time that the aircraft is directly above prominent landmarks along the traverse, or above monuments or markers disposed on the ground along the traverse, and thus is able to correlate surface with trace by means of time.

Another but more complicated method is to employ a camera which is geared to the recorder of the detector. In this way a series of pictures of the underlying terrain is taken as the traverse is flown simultaneously with the recording of the trace of radiation intensity and correlated therewith.

A third method involves the use of radioactive markers which are disposed at selected points along the traverse and are registered on the trace itself. It has been established, as shown in Fig. 10, that a 5 mg. source of radium gives a sharp "pip" on the trace at elevations up to at least 160 feet. These "pips," should they happen to coincide with a gamma ray anomaly in the ground, may be confusing. In order to avoid possibility of such confusion it is desirable to repeat the survey without employing the radioactive markers and comparing the two traces thus obtained. Another way to avoid confusion is to employ two radioactive markers spaced from each other far enough to produce two pips on the trace and thus produce a characteristic and easily recognizable pattern.

Referring to Fig. 10, the trace "A" was obtained while flying at an elevation of 20 feet at a speed of about 30 miles per hour over a point at which a 5 mg. source of radium was subsequently placed, the detectors employed being the panel of 6 previously described. The flight was repeated at an elevation of 20 feet (trace "B") with the radium source in place and a pronounced "pip" was obtained, so pronounced in fact that it ran off the scale. Additional repeat runs were made at elevations respectively of 40, 80, 160, 300, and 400 feet (Traces C, D, E, F and G). The pipe is pronounced up to 160 feet, and recognizable even at 400 feet.

A 5 mg. source of radium is extremely small, again indicating the surprising nature of the results obtained and the high efficiency of the multiple-plate type of detector for gamma rays. This efficiency is further illustrated by the fact that a 100 mg. source of radium buried in the ground to a depth of 6 feet is undetected by a modern ionization chamber, but may be found easily with a multiple-plate single wire counter of the type described in connection with Fig. 5.

The aspect of the invention illustrated in Fig. 10 (which involves determining the location of an aircraft with respect to terrain over which it is flying by detecting from the aircraft the increase in gamma radiation from a source, such as a small quantity of radium, located at a known point on the terrain) is useful outside of the prospecting field and is in fact of general utility in blind flying. Thus the position of an airfield or any other ground installation may be marked by placing radioactive markers at known locations, say at the four corners of a field. A gamma ray detector of relatively high efficiency is mounted in an aircraft, and a strong "pip" will be indicated by the recorder or indicator of the detector when the aircraft is over the source. In order to distinguish one monument or marker from another, the size of the radioactive sources employed may be different, or a monument may consist of a plurality of separate sources spaced far enough apart in a horizontal direction that each produces a substantially separate pip, thus producing at the recorder a distinctive pattern. For example one corner of a field may be marked with one source, a second with two, etc., or a distinctive pattern may be produced by employing as a monument a plurality of spaced sources of different sizes.

The height at which the gamma ray point source is detectable is a function of the size. As shown in Fig. 10, a very small source is easily detected at heights in excess of two hundred feet, and by increasing the size of the source the height may be increased to several thousand feet.

Air navigation through the application of a system of radioactive markers (say point sources of radium) at known ground locations offers outstanding advantages, first because the emission of gamma rays by the marker is assured, whereas lights, radio beacons, etc., may fail through failure of current. The radioactive marker is, therefore, more reliable and may be detected with simple reliable equipment irrespective of weather conditions, etc. Secondly, the intensity of the received radiation, as indicated by the height of the pip, is an index of the height of the aircraft above the marker.

Although 150 feet, or at least some distance between 100 and 200 feet now appears to be the optimum height for observation of gamma ray intensities in airborne surveys conducted in accordance with my invention, local conditions may require a different height for maximum contrast, and the invention contemplates broadly the practice of flying a detector across terrain at an elevation above ground such that maximum contrast is obtained between gamma radiation from the earth and other detected radiation. Preferably this detection is made continuously and the course flown is at least approximately a constant distance above ground.

Surveys made in accordance with my invention have shown that a given type of occurrence in a given locality (say a copper vein in granite in one mining district where the copper veins have been formed under similar conditions and sometimes at about the same time) will manifest a typical anomaly. In such case, it is advantageous to survey one or more known deposits to determine the typical anomaly and to look for similar anomalies in the neighborhood which are not associated with known deposits, but which may reveal one hitherto undisclosed. This is an important feature of the invention and one which tends to reduce the prospecting risk substantially. It is not necessary that the known deposit which is surveyed be intact at the time it is surveyed, for it has been demonstrated that the anomaly remains after the deposit has been mined out, in whole or in part. Consequently a survey in the neighborhood of a deposit which has been removed may establish the type of anomaly to be sought in surveys conducted in the neighborhood to locate extensions of the deposit or similar new occurrences.

As applied to the discovery of anomalies indicated by differences in the intensity of gamma rays emitted from different points in the overburden of a mineral deposit, the invention contemplates surface and underground operations, the term surface being employed to include those conducted on the surface as well as above the surface, i. e. with airborne instruments. The discovery of the anomalies in underground operations may be made by surveys conducted along bore holes or development openings such as raises and crosscuts.

When employing counters having a substantially higher efficiency than conventional Geiger-Mueller counters but in which the counting efficiency for background does not increase proportionately to the increase in gamma ray counting efficiency, the invention has more general application in surface operations and may be used not only to discover such anomalies but also as an aid in geological mapping, i. e. in the discovery of contacts, etc. The method may thus be used to cover a large area rapidly and cheaply with airborne instruments. The results obtained will permit accurate geological mapping of the terrain, but in the normal case most of the area will yield only negative results from the standpoint of locating mineral deposits, i. e. no substantial anomalies will be observed. In those portions of the area in which anomalies are observed in this large scale reconnaissance, detailed investigations should follow, either with airborne equipment or on the ground using a detector which is carried by man, animal or vehicle.

I claim:

1. In a geophysical survey involving the detection from an aircraft in flight of the intensity of natural gamma radiation emitted from the terrain along the course of the aircraft, the improvement which comprises placing a plurality of different decaying radioactive sources of gamma radiation respectively at a series of known locations spaced laterally from each other on the terrain, continuously detecting the intensity of the natural gamma radiation together with the gamma radiation from said sources with a pulse-type detector at the aircraft while it is in flight along its course, continuously integrating as an integrated function of time the output of the detector, recording the output of the detector to produce a trace of the integrated intensity against time, and adjusting the height of the aircraft in its flight along its course to the intensities of the sources so that each source produces a distinctive pattern at the point on the trace to which it corresponds, whereby the increase in intensity of the gamma radiation measured while the aircraft is near each of the sources will produce on the trace a distinctive pattern characteristic of the respective source and serve to correlate the record of natural gamma ray intensities with the terrain surveyed.

2. Process according to claim 1 in which the sources of gamma radiation disposed at the several locations are of distinctively different strengths.

3. Process according to claim 1 in which a different number of sources are disposed at each location and spaced laterally from each other at each location so as to provide a distinctive number of pips on the trace corresponding to each location.

References Cited in the file of this patent

UNITED STATES PATENTS

| Number | Name | Date |
|---|---|---|
| 1,948,552 | Weber et al. | Feb. 27, 1934 |
| 2,234,328 | Wolff | Mar. 11, 1941 |
| 2,394,703 | Lipson | Feb. 12, 1946 |
| 2,401,723 | Deming | June 11, 1946 |
| 2,499,489 | Goldstein et al. | Mar. 7, 1950 |